July 4, 1939.   C. F. BAISCH   2,164,866
BRAKE MECHANISM
Filed July 6, 1937   2 Sheets-Sheet 1
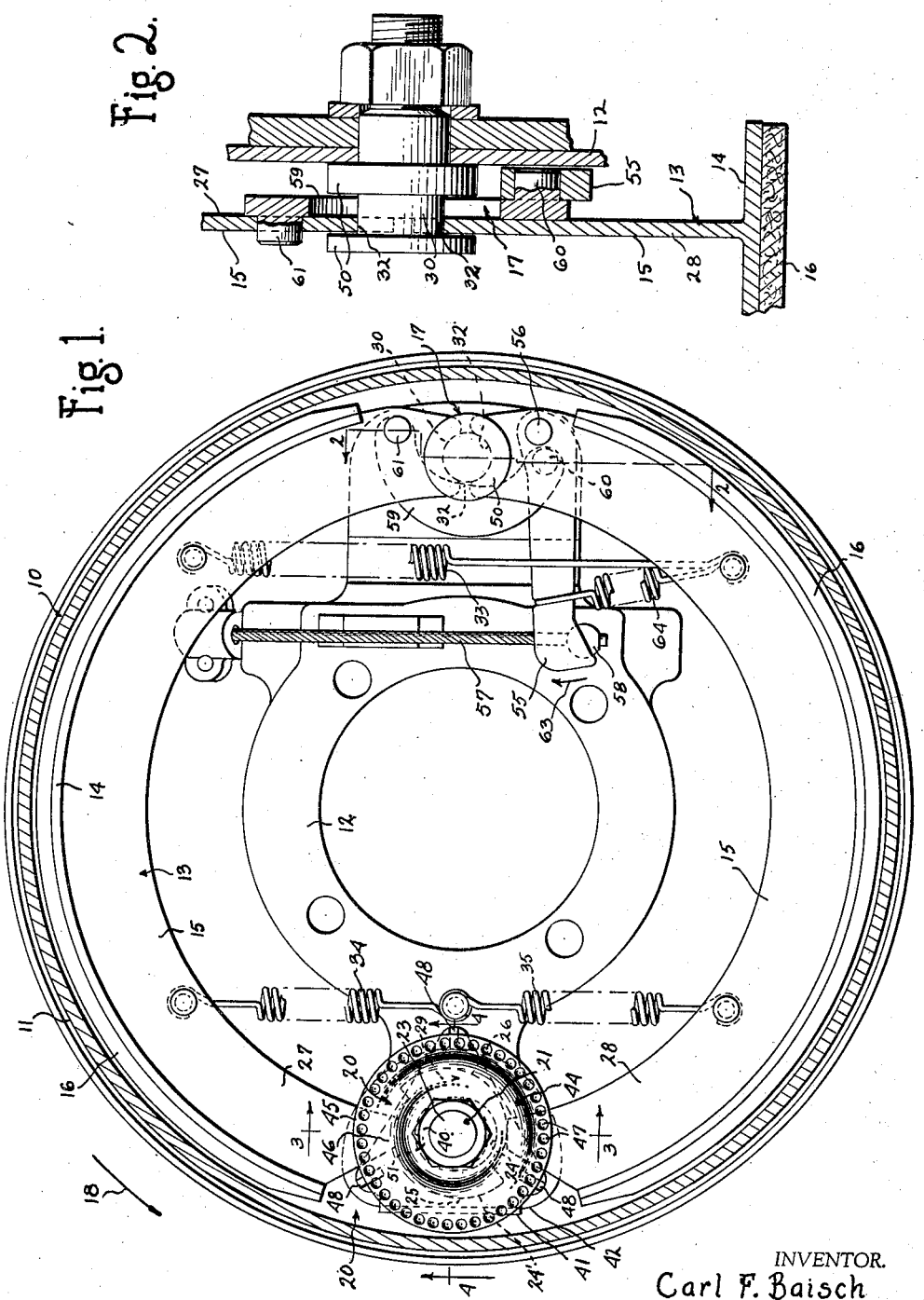
INVENTOR.
Carl F. Baisch
BY
Whittemore Hulbert & Belknap
ATTORNEYS July 4, 1939.  C. F. BAISCH  2,164,866
BRAKE MECHANISM
Filed July 6, 1937   2 Sheets-Sheet 2

INVENTOR.
Carl F. Baisch
BY
ATTORNEYS

Patented July 4, 1939

2,164,866

UNITED STATES PATENT OFFICE 2,164,866

BRAKE MECHANISM

Carl F. Baisch, Detroit, Mich., assignor to Kelsey-Hayes Wheel Company, Detroit, Mich., a corporation of Delaware Application July 6, 1937, Serial No. 152,249

9 Claims. (Cl. 188—79.5)

This invention relates generally to brake mechanisms and refers more particularly to an improved adjustment anchor device for the brake friction means.

It is one of the principal objects of the present invention to provide a compact, simple adjustment anchor device composed of a relatively few parts capable of being readily assembled and installed on the backing plate of the brake drum between adjacent ends of the friction means.

Another object of this invention which contributes materially to simplifying the construction of the adjustment anchor device consists in the provision of a cam rotatably supported on the backing plate between the ends of the friction means and having circumferentially spaced cam surfaces respectively engaging said ends of the friction means to effect outward movement of the latter ends upon rotation of the cam in one direction.

A further advantageous feature of the present invention resides in the provision of brake mechanism of the general character previously set forth wherein the adjacent ends of the friction means directly engage the cam surfaces on the cam in such a manner as to permit independent movement of the ends of the friction means radially of the drum. With this construction, the links hereinbefore provided between the adjustable member and the adjacent ends of the friction means are eliminated and, as a result, the number of parts are not only reduced, but the internal friction is minimized.

Still another object of this invention resides in the provision of an adjustment anchor device supported upon the backing plate of the brake drum for shifting movement circumferentially of the drum and thereby permitting the brake torque to be transferred from one shoe to the other through the adjustment device when the latter is employed in association with a servo brake.

A further object of this invention consists in the provision of brake mechanism having brake friction means of the shoe type wherein one of the shoes wears to a greater extent than the other shoe and wherein provision is made in the adjustment anchor device for adjusting the shoe having the greatest wear at a faster rate than the other shoe. In accordance with the present invention, the cam surface on the adjustable cam engaging the shoe having the greatest wear has a rise greater than the rise of the cam surface engaging the other shoe by an amount predetermined to compensate for the differential wear of the shoes and thereby effect uniform clearance between the shoes and the braking surface of the drum.

In addition to the foregoing, the present invention contemplates an improved means for preventing accidental rotation of the cam and for indicating predetermined increments of adjustment. The means for accomplishing this result, as well as the foregoing and other objects, will be made more apparent as this description proceeds, especially when considered in connection with the accompanying drawings, wherein:

Figure 1 is a side elevational view of brake mechanism equipped with an adjustment anchor device constructed in accordance with this invention;

Figure 2 is a sectional view taken substantially on the plane indicated by the line 2—2 of Figure 1;

Figure 3:
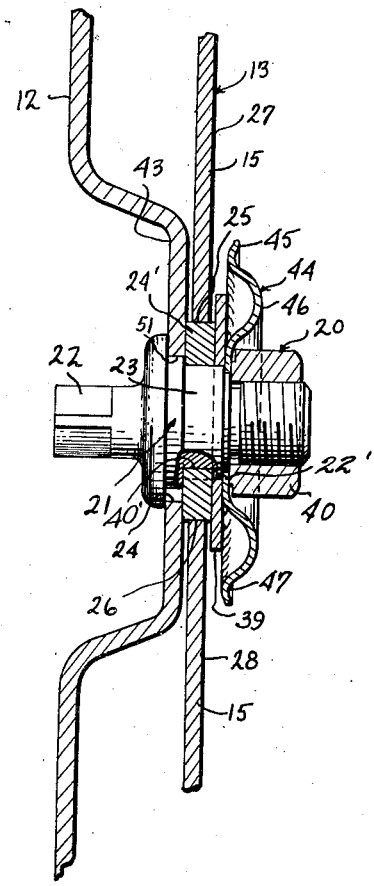
Figure 3 is a sectional view taken substantially on the plane indicated by the line 3—3 of Figure 1.

In Figure 1 of the drawings, I have shown a revoluble brake drum 10 having an axially extending annular brake flange 11 and having a backing plate 12 closing the rear side of the drum. In accordance with conventional practice, the backing plate 12 is secured against rotation and supports the brake mechanism within the drum.

The brake mechanism includes brake friction means 13 and the latter, in turn, comprises a pair of brake shoes supported upon the backing plate with the opposite ends spaced from each other circumferentially of the drum. Upon reference to Figure 2, it will be noted that the brake shoes are substantially T-shaped in cross section having axially extending head portions 14 extending adjacent the inner surface of the brake flange 11 and having radially inwardly extending web portions 15. As is usually the case, a brake lining 16 of the desired coefficient of friction is secured to the outer surface of the head portion 14 of each shoe for frictional engagement with the brake flange 11 when the shoes are moved outwardly relative to the drum.

The brake mechanism also includes an actuator 17 for expanding the shoes outwardly against the brake flange and this actuator will be more fully hereinafter set forth. At this time it may be pointed out that the actuator is carried by the friction means so as to permit shifting movement of the friction means in the direction of forward rotation of the drum indicated by the reference character 18 in Figure 1.

Figure 4:
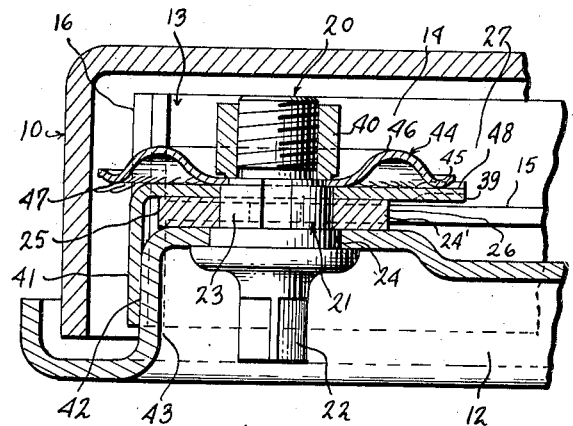
Figure 4 is a sectional view taken substantially on the plane indicated by the line 4—4 of Figure 1.

Referring now more in detail to the adjustment anchor device 20, it will be noted that this device is supported upon the backing plate between the adjacent ends of the brake shoes opposite the actuator 17. Upon reference to Figures 3 and 4, it will be noted that the adjustment device is provided with a stem 21 having a portion 22 located exteriorly of the backing plate, where it may be conveniently manipulated to rotate the stem and having a portion 23 extending into the drum between the ends of the friction means through an opening 24 in the backing plate. Keyed to the rotatable stem 21 by means of a key 21' is a cam 24' having diametrically opposed cam surfaces 25 and 26 respectively engageable with the adjacent ends of the primary and secondary shoes 27 and 28. Each cam surface has a constant rise and is effective upon rotation of the stem in the direction of the arrow 29 to move the shoe in engagement therewith toward the brake flange 11 about an abutment 30 secured to the backing plate 12 between the actuator ends of the shoes. Upon reference to Figure 1, it will be noted that the actuator ends of the shoes are formed with arcuate recesses 32 of a radius predetermined to pivotally engage the opposite sides of the abutment and are maintained into engagement with the abutment by means of the retracting spring 33 interconnecting the actuator ends of the shoes.

Figure 5:
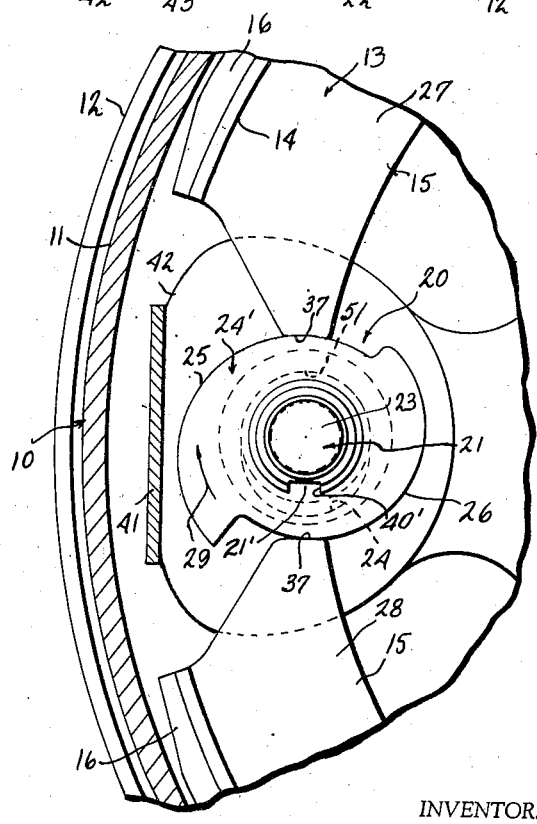
Figure 5 is a fragmentary side elevational view of the adjustment anchor device having certain parts broken away for the sake of clearness.

The adjustment ends of the brake shoes are yieldably maintained into engagement with the cam surfaces by means of the retraction springs 34 and 35 having the outer ends respectively connected to the primary and secondary shoes and having the inner ends anchored on the backing plate. Upon reference to Figure 5, it will be noted that the adjustment ends of the shoes are substantially straight as indicated by the reference character 37 and have a direct bearing engagement with the cam surfaces which permits independent radial shifting movement of the shoes relative to the cam. This construction is advantageous in that it eliminates the links hereinbefore provided for accomplishing the above result and thereby not only reduces the number of parts involved, but also minimizes internal friction.

The inner end of the stem 21 extends through an opening in a plate 39 secured on the stem by means of a nut 40 and having a flange 41 extending axially outwardly from the radially outer edge thereof. The flange 41 is elongated in the direction of the circumference of the drum and overlaps the radially outer wall 42 of a depression 43 formed in the backing plate 12 of the drum in the region of the adjustment device to house the axially outer end of the stem. The plate 39 is triangular in shape in elevation and is prevented from rotation with the stem 22 by engagement of the flange 41 with the radially outer wall of the depressed portion 43 in the backing plate.

In the present instance, a flexible spring disc 44 is secured against the axially inner side of the plate 39 by means of the nut 40 and this disc is keyed to the stem 22 for rotation therewith as a unit by means of a key 22' in the form of a projection on the disc extending into the same recess 40' in the stem 22 occupied by the key 21'. Upon reference to Figure 3, it will be noted that the disc is provided with a flexible peripheral portion 45 held into engagement with the axially inner side of the plate 39 under tension by fashioning the disc to form an annular bowed portion 46 surrounding the nut 40. Referring again to Figure 1 of the drawings, it will be noted that the flexible peripheral portion 45 of the disc is fashioned to form a series of circumferentially spaced detents 47 adapted to successively engage in one of the three grooves 48 formed at the corners of the triangular plate 39. Inasmuch as the disc 44 rotates as a unit with the stem and in view of the fact that the plate 39 is held from rotation, it follows that the detents cooperate with the grooves in not only yieldably resisting accidental rotation of the stem, but to also indicate predetermined increments of adjustment of the cam 24.

Attention may also be called to the fact at this time that the plate 39 cooperates with the adjacent side of the backing plate to retain the adjustment ends of the shoes into engagement with their respective cam surfaces. In other words, axial displacement of the adjustment ends of the shoes relative to the drum is prevented by the plate 39, and similar displacement of the actuator ends of the shoes is prevented by axially spaced shoulders 50 on the stud 30.

When the adjustment anchor device is employed in association with the servo brake, provision is made for transferring the torque from the primary shoe to the secondary shoe through the cam 24'. In detail, the opening 24 in the backing plate 12 is elongated in the direction of forward rotation of the drum in order to permit shifting movement of the stem with the brake shoes when the latter are expanded into engagement with the brake flange. In this connection, it is to be noted that the flange on the plate 39 merely slides against the wall 42 of the depressed portion on the backing plate when the adjustment device is shifted by the braking torque. Also, when this construction is provided, the spring 35 is designed to exert a greater force on the adjustment end of the secondary shoe than the retraction spring 34 so that in the released position of the brake, the stem is maintained into abutting engagement with the wall 51 of the slot. As a consequence, when the brake is applied during rotation of the drum in the reverse direction, the adjustment device forms an anchor and there is no torque transfer from one shoe to the other. In other words, a symmetrical brake results when the shoes are actuated during reverse rotation of the drum.

In brakes of the above type, the friction lining of the primary shoe 27 wears to a greater extent than the friction lining of the secondary shoe 28 and, in some cases, it is desirable to compensate for this differential wear during adjustment of the shoes. In the present instance, the rise of the cam surface 25 is greater than the rise of the cam surface 26 so that the primary shoe is moved outwardly by the cam 24' at a faster rate than the secondary shoe 28. In practice, the actual difference in the rate of wear between the linings of the two shoes may be predetermined and the degree of rise of the cam surface 25 on the cam 24' is preferably calculated to advance the primary shoe at a rate sufficiently greater than the secondary shoe to compensate for this difference in wear. Such procedure results in more uniform adjustment of the brake and appreciably increases braking efficiency throughout the life of the brake linings.

Although the adjustment anchor device is by no means limited to use in a brake having a particular type of actuator, nevertheless, for the purpose of illustrating the present invention, I have shown the actuator 17 as being of the leverage type. Briefly described, the actuator 17 comprises a lever 55 having the radially outer end pivotally connected to the end of the secondary shoe 28 at a point 56 adjacent the abutment 30 in close proximity to the diameter of the brake flange, and having the radially inner end connected to an operating cable 57 in the manner designated by the reference character 58. Upon reference to Figure 1, it will be noted that the lever 55 is connected to the abutment end of the primary shoe 27 by means of a spreader link 59. The spreader link 59 is pivotally connected to the lever 55 at a point 60 positioned adjacent the point of pivotal connection 56 of the lever with the secondary shoe and the opposite end of the spreader link is pivotally connected to the primary shoe at a point 61 located adjacent the abutment 30 in close proximity to the diameter of the brake flange. The link is curved longitudinally to provide clearance for the abutment 30 and at the same time permit the aforesaid locations of the pivots 60 and 61.

Assuming that the drum is rotating in the forward direction indicated by the arrow 18 in Figure 1 and assuming that the radially inner end of the lever 55 is moved in the direction of the arrow 63 by the cable 57, it will be noted that the lever 55 fulcrums about the point 56 and moves the abutment end of the primary shoe outwardly into engagement with the brake flange. During this operation, the actuator end of the secondary shoe is maintained into engagement with the abutment 30 by means of a spring 64 having one end connected to the secondary shoe adjacent the actuator end thereof and having the other end connected to the lever 55 adjacent the radially inner end of the latter. The spring 64 is lighter than the spring 35 so as not to interfere with the operation of the latter in maintaining the adjustment anchor device in abutting engagement with the side 51 of the opening 24 through the backing plate.

Movement of the primary shoe into engagement with the brake flange in the above manner effects a servo action and the latter tends to shift the primary shoe in the direction of rotation. In the present instance, shifting movement of the primary shoe in the forward direction of rotation of the brake drum is permitted by reason of the enlarged opening 24 and torque is transferred from the primary shoe through the cam 24' to the secondary shoe, with the result that the latter also wraps into engagement with the brake flange. Assuming now that the brake drum is rotating in the reverse direction and that the lever is operated by the cable to expand the shoes into engagement with the brake flange, it will be noted that after the shoes have been initially engaged with the brake flange, the lever 55 fulcrums about the point 60 on the secondary shoe and a reduction in leverage is accordingly effected. It will also be observed that the adjustment anchor device is in abutting engagement with the wall 51 of the opening 24 so that no torque is transferred from one shoe to the other. In other words, when the brake drum is rotating in the reverse direction, the brake mechanism becomes symmetrical and there is practically no servo action.

Particular reference has been made above to the location of the pivots 56, 60, and 61 relative to the abutment 30 and diameter of the brake flange 11. By locating these pivot points as close to the drum diameter as possible, sufficient leverage is provided with a link having a length suitable to permit extending the cable 57 between the abutment 30 and the opening through the backing plate through which the spindle or axle extends. Also, by arranging the pivots in predetermined relation to the abutment 30, any displacement of the radially inner end 55 of the lever caused by adjusting the brake shoes is negligible and, as a consequence, it is not necessary to adjust the length of the cable 57 when the brake shoes are adjusted by the device 20.

What I claim as my invention is:

1. In brake mechanism, a revoluble brake drum, a backing plate for the drum fixed against rotation, brake friction means supported on the backing plate within the drum for shifting movement circumferentially of the drum and having spaced ends, an adjustment device for the friction means including a member rotatably supported on the backing plate between the ends of the friction means and mounted for shifting movement with the friction means, said member having diametrically opposed cam surfaces respectively engageable with the ends of the friction means and effective upon rotation of the member in one direction to move the ends of the friction means outwardly relative to the drum, means accessible from a point exteriorly of the drum for rotating said member, and means for indicating predetermined increments of adjustment of the friction means by said member.

2. In brake mechanism, a revoluble brake drum, brake shoes supported within the drum for shifting movement circumferentially of the drum and having different rates of wear, an adjustment device for the brake shoes including a member rotatably supported between adjacent ends of the shoes and mounted for shifting movement circumferentially of the drum with said shoes, said member having circumferentially spaced cam surfaces respectively engageable with the adjacent ends of the shoes for moving the latter outwardly relative to the drum upon rotation of the member in one direction, the rise of the cam surface engaging the shoe having the greatest wear being greater than the rise of the other cam surface by an amount predetermined to compensate for the different rates of wear of the shoes and thereby secure uniform clearance between the shoes and braking surface of the drum, and means for rotating said member.

3. In brake mechanism, a revoluble brake drum, a backing plate for the drum fixed against rotation, brake friction means supported on the backing plate within the drum for shifting movement circumferentially of the drum and having spaced ends, a rotatable member extending into the drum between the ends of the friction means through an opening in the backing plate elongated to permit shifting movement of the member with the friction means, a cam secured to the member between the ends of the friction means and having diametrically opposed cam surfaces respectively engaging the ends of the friction means to move the latter outwardly relative to the drum upon rotation of the member in one direction, and means normally urging the member against the side wall of the opening opposite the wall facing the forward direction of rotation of the brake drum.

4. In brake mechanism, a revoluble brake drum, a backing plate for the drum fixed against rotation, brake friction means supported on the backing plate within the drum for shifting movement circumferentially of the drum and having spaced ends, a rotatable member extending into the drum between the ends of the friction means through an opening in the backing plate elongated to permit shifting movement of the member with the friction means, a cam secured to the member within the drum and having circumferentially spaced cam surfaces effective upon rotation of the member to respectively move the friction means outwardly relative to the drum, a flexible element secured to the member for movement as a unit with the latter, a plate shiftable with said member and held against rotation with the latter, and cooperating means on the plate and flexible element for indicating predetermined increments of adjustment of the cam.

5. In brake mechanism, a revoluble brake drum, a backing plate for the drum fixed against rotation, brake friction means supported on the backing plate within the drum for shifting movement circumferentially of the drum and having spaced ends, a rotatable member extending into the drum between the ends of the friction means through an opening in the backing plate elongated to permit shifting movement of the member with the friction means, a cam secured to the member between the ends of the friction means and having diametrically opposed cam surfaces respectively engaging the ends of the friction means to move the latter outwardly relative to the drum upon rotation of the member in one direction, a flexible disc secured to the member for movement as a unit therewith and having circumferentially spaced detents adjacent the periphery thereof, and a plate shiftable with said member and held against rotation by the latter, said plate having circumferentially spaced recesses successively engageable with the detents on the flexible disc to indicate predetermined increments of adjustment of the cam.

6. In brake mechanism, a revoluble brake drum, a backing plate for the drum fixed against rotation, brake friction means supported on the backing plate within the drum and having spaced ends, a rotatable member extending through the backing plate into the drum between said ends of the friction means, a cam secured to the member and having circumferentially spaced cam surfaces effective upon rotation of the member in one direction to respectively move the ends of the friction means outwardly relative to the brake drum, a flexible element rotatable as a unit with the member, a plate supported by the backing plate against rotation, and cooperating means on the plate and flexible element for indicating predetermined increments of adjustment of the cam.

7. In brake mechanism, a revoluble brake drum, a backing plate for the drum fixed against rotation, brake friction means supported on the backing plate within the drum and having spaced ends, a rotatable member extending through the backing plate into the drum between said ends of the friction means, a cam secured to the member and having circumferentially spaced cam surfaces effective upon rotation of the member in one direction to respectively move the ends of the friction means outwardly relative to the brake drum, a disc secured to the member for movement as a unit therewith and having circumferentially spaced detents adjacent the periphery thereof, and a plate supported adjacent the disc and held against rotation, said plate having circumferentially spaced grooves successively engageable with the detents of the flexible disc to indicate predetermined increments of adjustment of the cam.

8. In brake mechanism, a revoluble brake drum, a backing plate for the drum fixed against rotation, brake friction means supported on the backing plate within the drum for shifting movement circumferentially of the drum and having spaced ends, a cam rotatably supported between said ends for shifting movement with the friction means circumferentially of the drum and having diametrically opposed cam surfaces respectively engaging the ends of the friction means to move the latter outwardly relative to the drum upon rotation of the cam in one direction, an abutment limiting shifting movement of the cam in one direction with the friction means, and means normally urging said cam to a position wherein shifting movement of the cam in the last named direction is prevented by said abutment.

9. In brake mechanism, a revoluble brake drum, a backing plate for the drum fixed against rotation, brake friction means supported on the backing plate within the drum for shifting movement circumferentially of the drum and having spaced ends, a rotatable member extending into the drum between the ends of the friction means through an opening in the backing plate elongated to provide for shifting movement of the member with the friction means, a cam on the member between the ends of the friction means and having cam surfaces respectively engaging the ends of the friction means to move the latter outwardly relative to the drum upon rotation of the member in one direction, means accessible from a point exteriorly of the drum for rotating the member, and means normally urging the member in a direction circumferentially of the drum against one side wall of the opening aforesaid through the backing plate.

CARL F. BAISCH.